US012374208B2

(12) United States Patent
Duschl

(10) Patent No.: US 12,374,208 B2
(45) Date of Patent: Jul. 29, 2025

(54) EMERGENCY ALERT SYSTEMS AND METHODS BASED ON MOTION DETECTION

(71) Applicant: Robert Anthony Duschl, Lititz, PA (US)

(72) Inventor: Robert Anthony Duschl, Lititz, PA (US)

( * ) Notice: Subject to any disclaimer, the term of this patent is extended or adjusted under 35 U.S.C. 154(b) by 0 days.

(21) Appl. No.: 18/517,585

(22) Filed: Nov. 22, 2023

(65) Prior Publication Data

US 2024/0169818 A1 May 23, 2024

Related U.S. Application Data

(60) Provisional application No. 63/427,682, filed on Nov. 23, 2022.

(51) Int. Cl.
*G08B 21/04* (2006.01)
*G08B 21/02* (2006.01)

(52) U.S. Cl.
CPC ..... *G08B 21/0415* (2013.01); *G08B 21/0283* (2013.01); *G08B 21/0476* (2013.01)

(58) Field of Classification Search
CPC ............ G08B 21/0415; G08B 21/0283; G08B 21/0476
See application file for complete search history.

(56) References Cited

U.S. PATENT DOCUMENTS 4,418,337 A 11/1983 Bader
6,211,783 B1 4/2001 Wang
6,989,742 B2 1/2006 Ueno
7,242,305 B2 7/2007 Cuddihy et al.
7,443,304 B2 10/2008 Rowe et al.
7,772,965 B2 * 8/2010 Farhan .................. G16H 40/63 340/552
8,184,001 B2 5/2012 Kuris et al.
9,866,507 B2 1/2018 Frenkel et al.
10,212,495 B2 2/2019 Lloyd et al.
(Continued)

FOREIGN PATENT DOCUMENTS

AU 2021290445 A1 * 2/2023 ........... A61B 5/1118
GB 2498951 A * 8/2013 ........... G08B 21/043

*Primary Examiner* — Curtis A Kuntz
*Assistant Examiner* — James E Munion
(74) *Attorney, Agent, or Firm* — Dunlap Bennett & Ludwig, PLLC

(57) ABSTRACT

A monitoring unit in an emergency alert system a housing and a motion sensor positioned within the housing and configured to detect motion within a monitoring area. The monitoring unit includes a communication device configured to electronically communicate with one or more remote electronic devices and a microcomputer. The microcomputer includes a memory device storing instructions and a processing device configured to execute the instructions to: determine motion data from the motion sensor, the motion data representing movement or lack of movement by a subject in the monitoring area, determine that the lack of movement occurs within a monitoring period, determine that a duration of the lack of movement exceeds a threshold, and transmit an electronic alert message to the one or more remote electronic devices using the communication device. The electronic alert message indicates a potential emergency based on the lack of movement.

10 Claims, 4 Drawing Sheets

(56) References Cited

U.S. PATENT DOCUMENTS

| | | | | |
|---|---|---|---|---|
| 10,226,177 | B2 | 3/2019 | Chamberlain | |
| 10,410,499 | B2 | 9/2019 | Amir | |
| 10,467,879 | B2 * | 11/2019 | Stefanski | G08B 21/0423 |
| 10,475,141 | B2 * | 11/2019 | McIntosh | G16H 15/00 |
| 2006/0055543 | A1 * | 3/2006 | Ganesh | G08B 21/0423 340/526 |
| 2008/0294462 | A1 | 11/2008 | Nuhaan et al. | |
| 2009/0040052 | A1 * | 2/2009 | Cameron | G08B 25/016 340/573.1 |
| 2016/0213072 | A1 | 7/2016 | Chung | |
| 2021/0074138 | A1 * | 3/2021 | Micko | G08B 21/0492 |
| 2022/0110546 | A1 * | 4/2022 | Clifford | A61B 5/4088 |
| 2022/0230746 | A1 * | 7/2022 | Anthapur | G16H 40/67 |

* cited by examiner

EMERGENCY ALERT SYSTEMS AND METHODS BASED ON MOTION DETECTION

CROSS-REFERENCE TO RELATED APPLICATIONS

This application claims the benefit of priority of U.S. provisional application No. 63/427,682, filed Nov. 23, 2023, the entire contents of which are herein incorporated by reference.

FIELD

The present disclosure relates to motion detection systems and, more particularly, to emergency alert systems, including motion detection capabilities.

BACKGROUND

Many seniors and disabled persons may live by themselves and may not have anyone regularly checking on them. A fall, disabling event, or other emergency can become very serious if a senior or disabled person is not discovered within a few hours. Current emergency alert systems include a call button that alerts emergency services of a potential fall, disabling event, or other emergency. These systems require the person in distress to push an alert button or call out for help. These systems, however, are ineffective if the person in distress is unconscious or incapacitated. Additionally, these systems require the person to always carry the alert button. Typically, these systems also require an expensive monitoring service.

As can be seen, there is a need for an emergency alert system that addresses the above drawbacks.

SUMMARY

In one aspect of the present disclosure, a monitoring unit in an emergency alert system a housing and a motion sensor positioned within the housing and configured to detect motion within a monitoring area. The monitoring unit includes a communication device configured to electronically communicate with one or more remote electronic devices. The monitoring unit includes a microcomputer coupled to the communication device and the motion sensor. The microcomputer includes a memory device storing instructions and a processing device configured to execute the instructions to: determine motion data from the motion sensor, the motion data representing movement or lack of movement by a subject in the monitoring area, determine that the lack of movement occurs within a monitoring period, determine that a duration of the lack of movement exceeds a threshold, and transmit an electronic alert message to the one or more remote electronic devices using the communication device. The electronic alert message indicates a potential emergency based on the lack of movement.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

As stated above, seniors, disabled persons, children, etc. need a system that allows monitoring of their health status and current conditions. For example, a fall, disabling event, incapacitation, or other emergency can prevent seniors, disabled persons, children, etc. from requesting assistance and can lead to serious issues if they are not discovered within a short time frame, e.g., minutes, a few hours, etc. Current alert systems only provide a solution that requires active input from seniors, disabled persons, children, etc. These systems also require expensive monitoring plans that may be onerous to certain individuals.

Broadly, an embodiment of the present disclosure provides an emergency alert system and method that does not require active input from a subject, e.g., seniors, disabled persons, children, etc., during an emergency. The emergency alert system uses motion detection, e.g., a motion sensor, to determine if no motion occurred during a programmable monitoring (time) period. If motion of the subject does not occur during the monitoring period, possibly indicating an emergency, the emergency alert system can send one or more electronic warning messages to one or more contacts, e.g., a family member, neighbor, emergency personnel, a doctor, etc. As such, the emergency alert system sends one or more warning text messages to a user-entered contact, e.g., cell number, instead of to an expensive monitoring agency.

In embodiments, the emergency alert system can include a portable monitoring device that is easily fixed to a wall area where motion would regularly be expected. As such, the subject and/or occupant does not have to wear or activate a device. This portable monitoring device can automatically send an electronic message, e.g., a cell phone text warning, to a user-entered contact, e.g., cell number. This warning tells a relative or neighbor that no motion has been detected during the programmed monitoring period, e.g., 6:00 A.M. to 9:00 A.M., so they can decide what action is required to follow up. No expensive monitoring agency is required. The emergency alert system does not require the subject, e.g., seniors, disabled persons, children, etc., to remember to wear an alert button at all times. The emergency alert system also does not require the subject to be able to press the alert button when needed.

Figure 1:
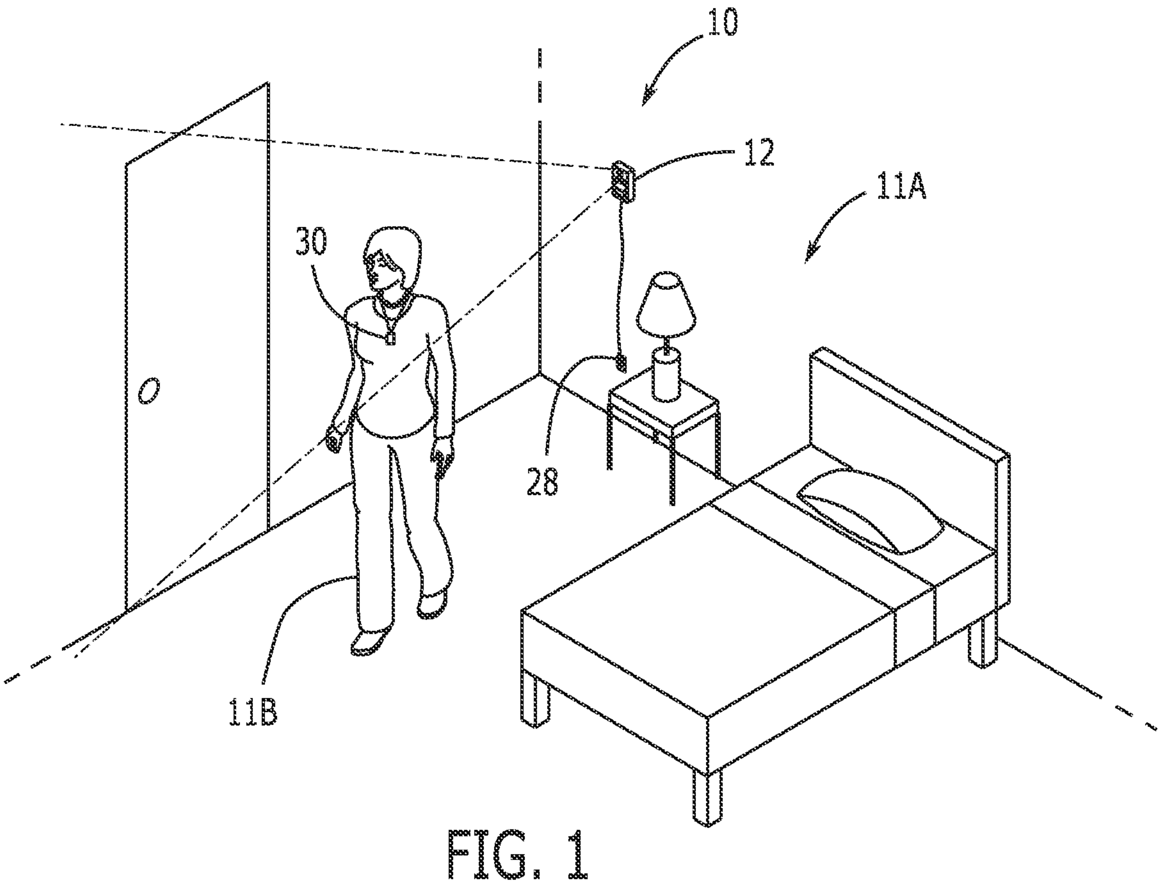
FIG. 1 is a top-perspective view of an emergency alert system, according to aspects of the present disclosure.

Referring now to FIGS. 1-6, FIG. 1 illustrates an emergency alert system 10, according to aspects of the present disclosure. The emergency alert system 10 provides a reliable process for detecting potential emergency situations in a monitoring area 11A without requiring active input from a subject 11B. While FIG. 1 illustrates various components of the emergency alert system 10, additional components can be added, and existing components can be removed.

As illustrated in FIG. 1, the emergency alert system 10 includes a monitoring unit 12 that is portable and can be affixed to a structure in a monitoring area. The monitoring area 11A can be any location where the subject 11B can be monitored. For example, the monitoring area 11A can be a room in a building, e.g., a den, kitchen, bathroom, living room, bedroom, nursery, garage, etc. The subject 11B can be any person and/or individual that desires to be monitored. For example, the subject 11B can include senior citizens, disabled persons, children, etc. While FIG. 1 illustrates a single monitoring unit 12, the emergency alert system 10 can include multiple monitoring units 12 that communicate and operate together to in the same monitoring area and/or different monitoring areas.

The monitoring unit 12 utilizes motion detection, e.g., a motion sensor 14 (described below in further detail), to determine if no motion occurred during in the monitoring area 11A during a programmable monitoring (time) period. If motion of the subject does not occur during the monitoring period, possibly indicating an emergency, the emergency alert system 10 can send one or more electronic warning messages to one or more contacts, e.g., a family member, neighbor, emergency personnel, a doctor, etc. As such, the emergency alert system 10 sends one or more warning text messages to a user-entered contact, e.g., cell number, instead of to an expensive monitoring agency. Additionally, the emergency alert system 10 does not require the subject 11B to remember to wear an alert button at all times. The emergency alert system 10 also does not require the subject to be able to press the alert button when needed.

Figure 2:
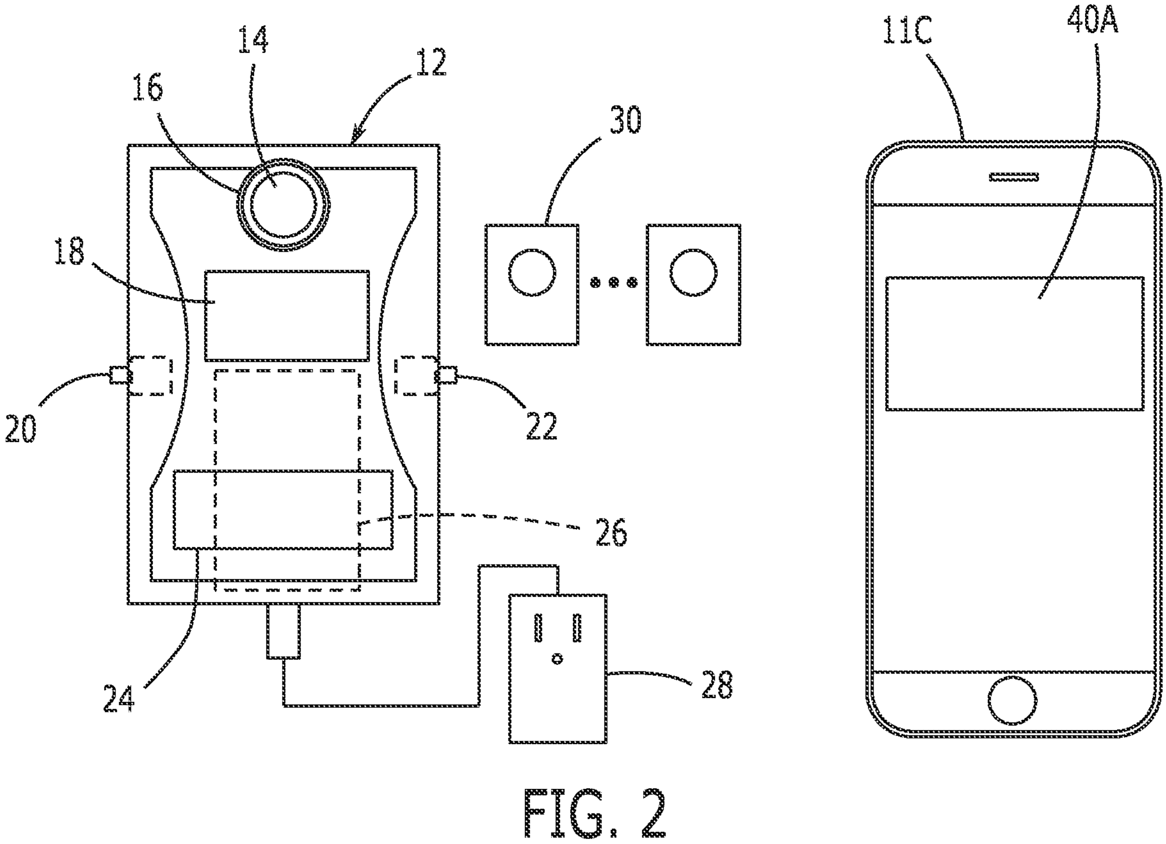
FIG. 2 is a schematic diagram of components of the emergency alert system of FIG. 1, according to aspects of the present disclosure.

As illustrated in FIG. 2, which illustrates the components of the monitoring unit 12, the monitoring unit 12 includes a motion sensor 14, a pet shield 16, a display 18, one or more control buttons (a motion program button 20, a remote program button 22, and an alert button 24), a microcomputer 26. The components of the monitoring unit 12 can be contained within a housing made of materials such as plastics, metals, metal alloys, and the like. The monitoring unit 12 can be portable and affixed to different structures, for example, a wall in the monitoring area 11A. In some embodiments, the monitoring unit 12 can be electrically coupled to an external power source, e.g., a power outlet 28. In some embodiments, the monitoring unit 12 can include an internal power source, e.g., a battery, that powers the monitoring unit 12 and/or operates as a backup power source for the monitoring unit.

The motion sensor 14 can be any type of electronic sensor that detects motion with the monitoring area 11A. For example, the motion sensor 14 can include one or more of infrared sensors, ultrasonic sensors, microwave sensors, tomographic sensors, image sensors, laser sensors, vibration sensors, strain gauge sensors, and the like. In some embodiments, the motion sensor 14 may not have the capability of capturing still images and/or video to protect the privacy of the subject 11B. In some embodiments, if the motion sensor 14 captures image and/or video data, the microcomputer 26 can prevent the storage and/or transmission of the image and/or video data to protect the privacy of the subject 11B.

In some embodiments, the monitoring unit 12 can include the pet shield 16 that is installed around the motion sensor 14 to limit the field of view and prevent false triggers from pets or other extraneous movements. The pet shield 16 can include a shield that surrounds a portion of an aperture of the motion sensor 14, limiting the field of view of the motion sensor and an attachment device, e.g., adhesive, magnet, etc., that allows attachment to the monitoring unit 12.

The microcomputer 26 can include the hardware and/or software to control the operation of the monitoring unit 12, receive motion data from the motion sensor 14, generate one or more warning alerts and/or messages, and communicate the one or more warning alerts and/or messages to one or more contacts programmed into the microcomputer 26. For example, the microcomputer 26 can include one or more communication devices that allow the monitoring unit 12 to communicate with one or more remote electronic devices, for instance, an electronic device 11C. The electronic device 11C can include one or more electronic devices such as a laptop computer, a desktop computer, a tablet computer, a smartphone, a thin client, a smart appliance, and the like. The electronic device 11C can include a device of the subject used to control, monitor, and program the monitoring unit 12. The electronic device 11C can also include an electronic device of a user receiving alerts from the monitoring unit 12.

In embodiment, the motion program button 20 can be utilized to program a watch period into the microcomputer 26, for example, 6:00 A.M. to 10 A.M, and a no-motion time limit. Once input, the microcomputer 26 can store the watch period and the no-motion time limit in a memory device. The microcomputer 26 continuously monitors the motion sensor 14 and calculates how long since the last motion was detected. If in the watch period and the no-motion time limit is exceeded, the microcomputer 26 sends a warning message to a remote device, for example, sends an electronic message to the electronic device 11C over a network connection. The warning message can be sent using any type of electronic communication protocol such as SMS message, email message, private messenger message, prerecorded audio message, an emergency alert compliant message, and the like. The contact information can be programmed into the microcomputer 26 using the remote program button 22 and stored in the memory device. The contract information can include a cell phone number, a phone number, an email address, a messenger application user name, a network address, and the like.

For example, if no motion is detected within the period, the monitoring unit 12 sends an Alert Text message to the programmed cell number. If the device or any remote ALERT button is pressed, the monitoring unit 12 sends an immediate Alert Text message to the programmed cell number.

The display 18 can be utilized to control/monitor the operation of the monitoring unit 12 and/or program the monitoring unit 12. The display 18 can include a display screen such as a light-emitting diode ("LED") display, an organic LED ("OLED") display, an active-matrix OLED ("AMOLED") display, a liquid crystal display ("LCD"), a thin-film transistor ("TFT") LCD, a plasma display, a quantum dot ("QLED") display, and so forth. The display 18 can include a touchscreen can include a resistive touchscreen, a capacitive touchscreen, and so forth and incorporates the functionality of the one or more control buttons (the motion program button 20, the remote program button 22, and the alert button 24).

The microcomputer 26 also monitors the alert button 24 and can send a warning message immediately if the alert button 24 is actuated. The emergency alert system 10 can also include one or more remote alert buttons 30. The remote alert buttons can be placed through-out a structure and/or worn by the subject 11B, for example, as a necklace as illustrated in FIG. 1.

The microcomputer 26 can monitor the time of day and will send daily status messages if enabled. For example, the microcomputer 26 can send a warning message to a remote device, for example, sends the daily status messages to the electronic device 11C over a network connection. The microcomputer 26 can also include a watchdog function to detect a power or network failure and can send an alert message if this occurs.

In some embodiments, the electronic device 11C can store and execute a monitoring application 40A that communicates with the monitoring unit 12. The monitoring application 40A can be a specifically designed application that operates with the monitoring unit 12 to perform the processes and methods described herein. In embodiments, the monitoring application 40A can be a third-party application, such as a web browser, that communicates with the monitoring unit 12 to perform the processes and methods described herein. For example, the monitoring application 40A can be utilized to remotely program the monitoring unit 12.

Figure 3:
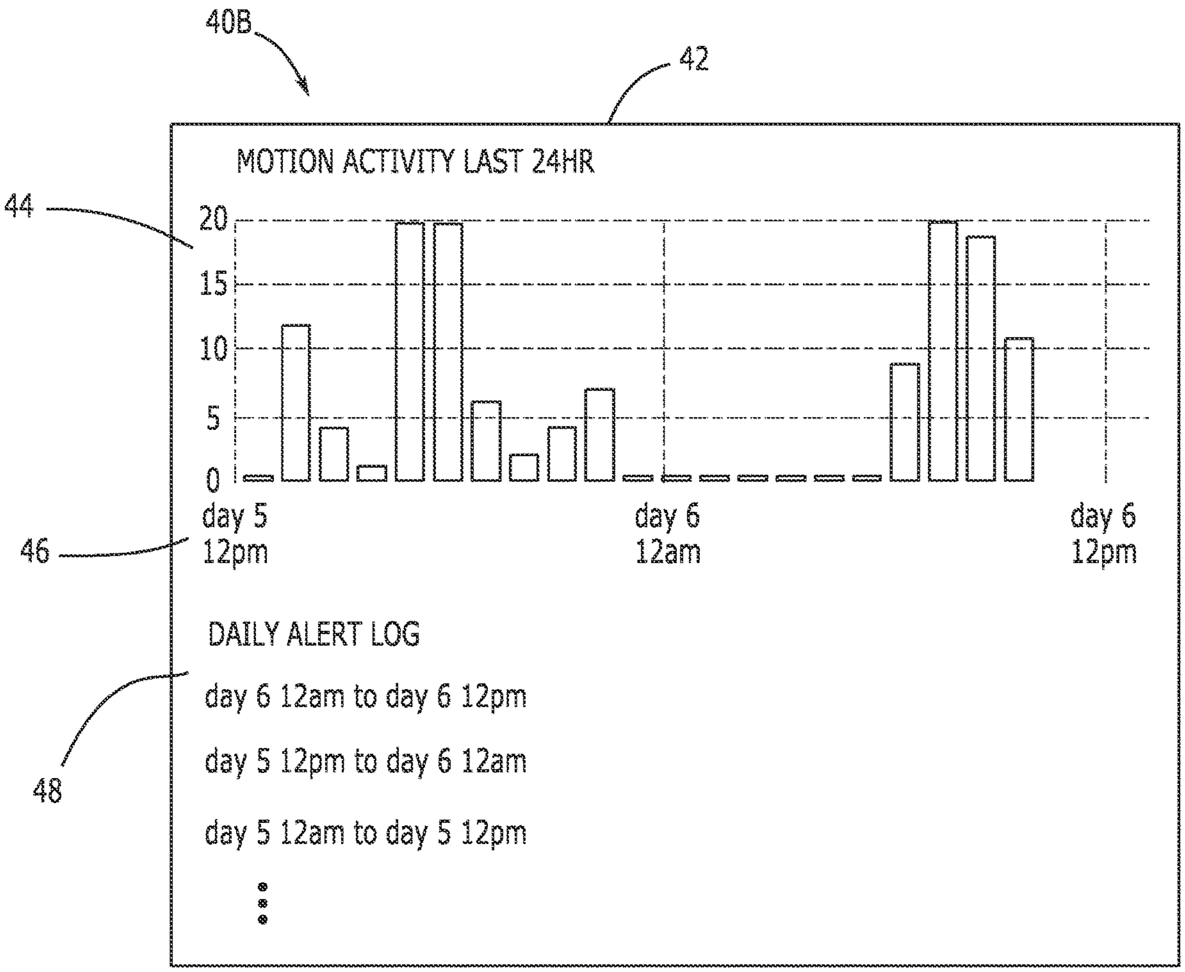
FIG. 3 is a diagram of a graphical user interface generated by the emergency alert system of FIG. 1, according to aspects of the present disclosure.
Figure 4:
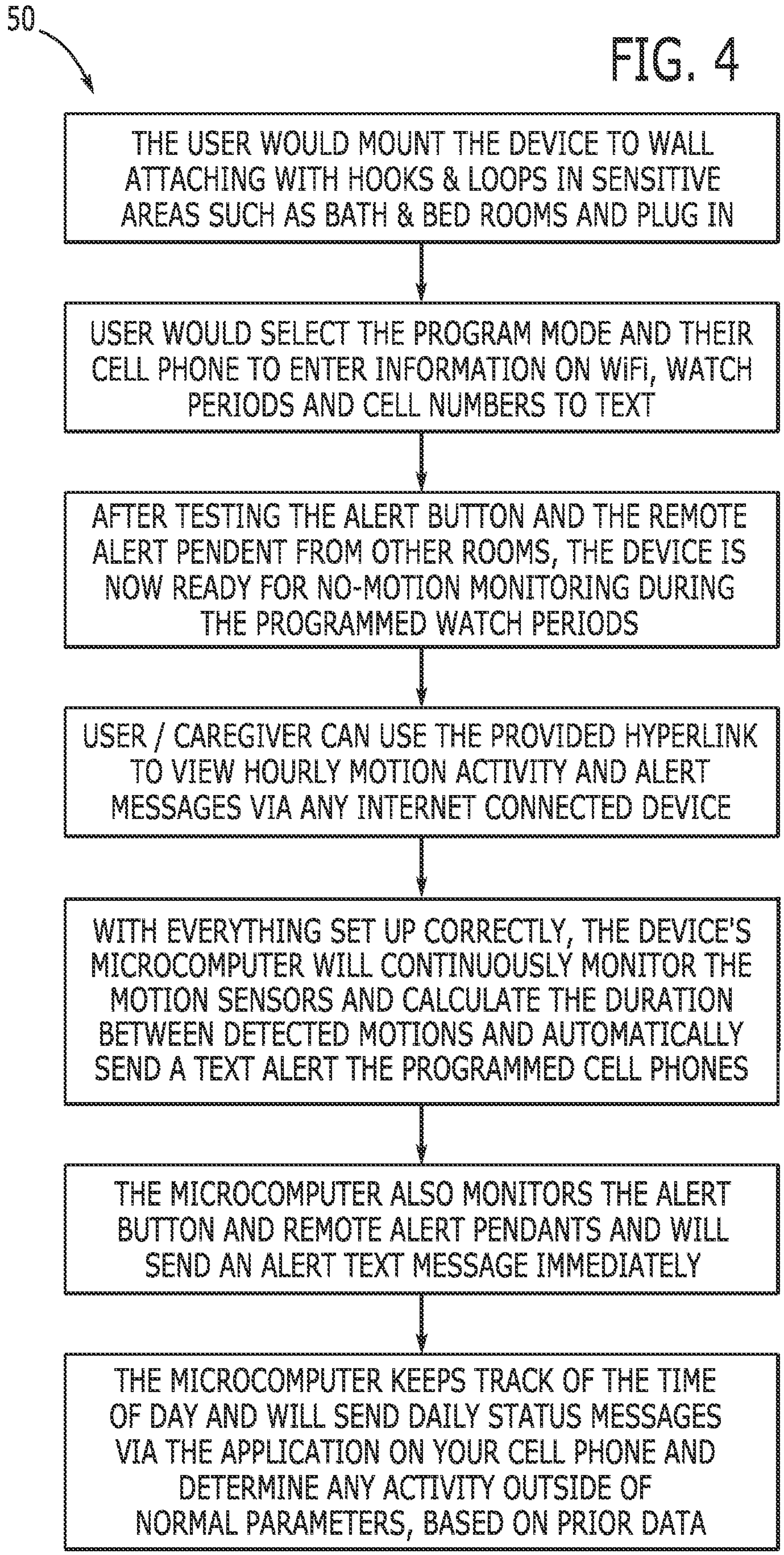
FIG. 4 is a flow diagram of a method for that can be performed with the emergency alert system of FIG. 1, according to aspects of the present disclosure.

Likewise, for example, the monitoring application 40A can be utilized to receive communications from the monitoring unit 12, such as warning messages, status messages, and the like. FIG. 3 illustrates one example of a graphical user interface 40B that can be generated and displayed by the monitoring application 40A and/or on the display 18 of the monitoring unit 12. The graphical user interface 40B can include a status report 42. The status report 42 can include a motion activity graph 44 that display a number of motion activities at different time period 46. The status report 42 can also include a daily alert log 48 for different monitoring periods.

In embodiments, the microcomputer 26 and/or the motion sensor can be constructed as an electronic circuit board, including the electronic components of the microcomputer 26 such as a processor, a memory device, a communication device, a system bus, etc. For example, a processor can include a microprocessor, a computer processing unit ("CPU"), a graphics processing unit ("GPU"), a neural processing unit, a physics processing unit, a digital signal processor, an image signal processor, a synergistic processing element, a field-programmable gate array ("FPGA"), a sound chip, a multi-core processor, and so forth. As used herein, "processor," "processing component," "processing device," and/or "processing unit" can be used generically to refer to any or all of the aforementioned specific devices, elements, and/or features of the processing device.

Likewise, for example, a memory device can be and/or include computerized storage medium capable of storing electronic data temporarily, semi-permanently, or permanently. The memory device can be or include a computer processing unit register, a cache memory, a magnetic disk, an optical disk, a solid-state drive, and so forth. The memory device can be and/or include random access memory ("RAM"), read-only memory ("ROM"), static RAM, dynamic RAM, masked ROM, programmable ROM, erasable and programmable ROM, electrically erasable and programmable ROM, and so forth. As used herein, "memory," "memory component," "memory device," and/or "memory unit" can be used generically to refer to any or all of the aforementioned specific devices, elements, and/or features of the memory device.

Likewise, for example, the communication device enables the microcomputer 26 to communicate with other devices and systems, e.g., the electronic device 11C. The communication device can include, for example, a networking chip, one or more antennas, and/or one or more communication ports. The communication device can generate radio frequency (RF) signals and transmit the RF signals via one or more of the antennas. The communication device can generate electronic signals and transmit/receive the RF signals via one or more of the communication ports. The electronic signals can be transmitted to and/or from communication hardware by the communication ports. The communication device can generate optical signals and transmit/receive the optical signals to one or more of the communication ports. The communication device can include hardware and/or software for generating and communicating signals over a direct and/or indirect network communication link. As used herein, a direct link can include a link between two devices where information is communicated from one device to the other without passing through an intermediary. For example, the direct link can include a Bluetooth™ connection, a Zigbee connection, a Wifi Direct™ connection, a near-field communications ("NFC") connection, an infrared connection, a wired universal serial bus ("USB") connection, an ethernet cable connection, a fiber-optic connection, a firewire connection, a microwire connection, and so forth. In another example, the direct link can include a cable on a bus network. An indirect link can include a link between two or more devices where data can pass through an intermediary, such as a router, before being received by an intended recipient of the data. For example, the indirect link can include a WiFi connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications ("GSM") standard, a code division multiple access ("CDMA") standard such as the universal mobile telecommunications standard, an orthogonal frequency division multiple access ("OFDMA") standard such as the long term evolution ("LTE") standard, and so forth.

Figure 5:
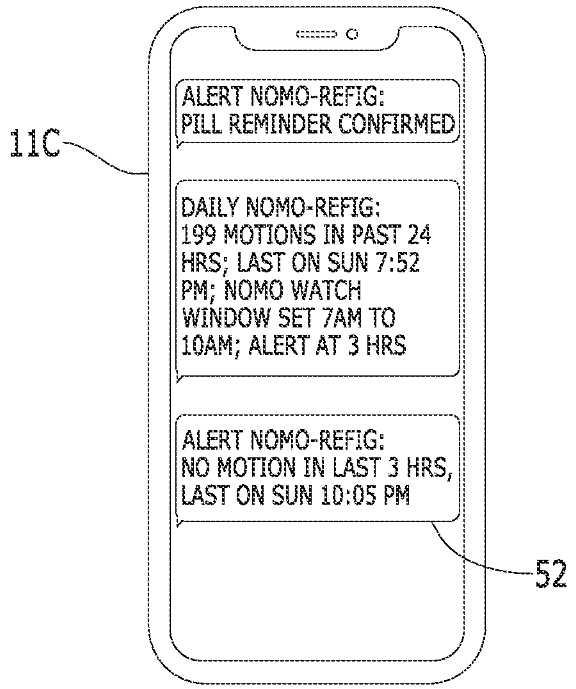
FIG. 5 is a diagram of status messages generated by the emergency alert system of FIG. 1, according to aspects of the present disclosure.

FIG. 5 illustrates a method 50 performed by the emergency alert system 10, according to aspects of the present disclosure. While FIG. 5 illustrates various stages of the method 50, additional stages can be added, and existing stages can be removed and/or reordered.

In the method 50, a user can mount the monitoring unit 12 in a structure. For example, the user can mount the monitoring unit 12 on a wall of a bathroom and/or bedroom using an attachment device, such as hook and loop. The user can plug the monitoring device into a power source.

Then, the user can program the monitoring unit 12. For example, the user can select the program mode and the cell phone information to enter information on the network, the watch periods, and cellphone numbers to text.

Next, the user can test the monitoring unit 12. For example, the user can test the motion sensor 14 and the alert buttons 24/30. After testing, the monitoring unit 12 is now ready for no-motion monitoring during the programmed watch periods.

Figure 6:
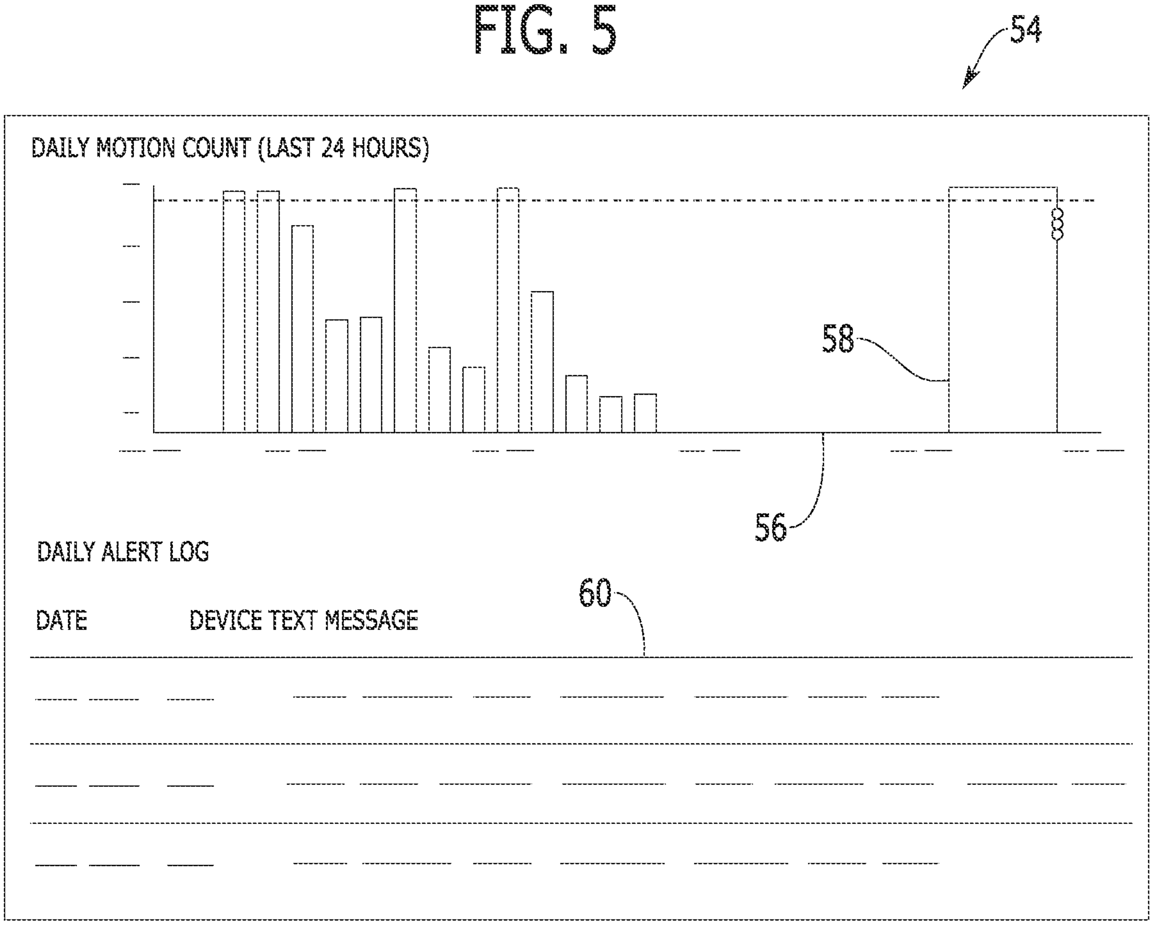
FIG. 6 is a diagram of another graphical user interface generated by the emergency alert system of FIG. 1, according to aspects of the present disclosure.

Then, a user and/or caregiver can receive alerts and monitor the subject 11B using the monitoring unit 12. For example, the user and/or caregiver can use a provided hyperlink to view hourly motion activity and alert messages via an internet-connected device. For example, as illustrated in FIG. 5, the electronic device 11C can receive text messages, such as text message 52. The user of the electronic device 11C can select a text message, such as the text message 52, to access a status report 54, as illustrated in FIG. 6. The status report 54 can include a daily motion count graph 56 that displays motion activity 58. The status report 54 can also include a daily alert log 60.

Next, the microcomputer 26 continuously monitors the motion sensor 14 and the alert button 24/30. The microcomputer 26 calculates how long since the last motion was detected. If in the watch period and the no-motion time limit is exceeded, the microcomputer 26 sends a warning message to a remote device, for example, sends an electronic message to the electronic device 11C over a network connection. The microcomputer 26 also tracks the time of day and send daily status messages. The microcomputer 26 can also analyze the prior data to determine if any activity is outside normal parameters.

It should be understood, of course, that the foregoing relates to exemplary embodiments of the disclosure and that modifications can be made without departing from the spirit and scope of the disclosure as set forth in the following claims.

What is claimed is:

1. A monitoring unit in an emergency alert system, comprising:

a housing;

a motion sensor positioned within the housing and configured to detect motion within a monitoring area, wherein the motion sensor consists of passive infrared detection so that the motion sensor lacks an ability to capture images or video, whereby privacy of the monitoring area is protected;

a communication device configured to electronically communicate with one or more remote electronic devices; and a microcomputer coupled to the communication device and the motion sensor, the microcomputer comprising:

a memory device storing instructions; and a processing device configured to execute the instructions to:

determine motion data from the motion sensor, the motion data representing movement and lack of movement by a subject in the monitoring area, irrespective of a posture of the subject, determine that the lack of movement occurs within a monitoring period, determine that a duration of the lack of movement exceeds a threshold, and transmit an electronic alert message to the one or more remote electronic devices using the communication device only if the duration of the lack of movement exceeds said threshold, wherein the electronic alert message indicates a potential emergency based on the lack of movement.

2. The monitoring unit of claim 1, further comprising:

an alert button in communication with the microcomputer, wherein the microcomputer transmits the electronic alert message in response to the alert button being actuated, wherein the alert button is directly connected to an external surface of the housing.

3. The monitoring unit of claim 1, wherein the processing device of the microcomputer is further configured to execute the instructions to:

generate and transmit a status report to the one or more remote electronic devices using the communication device, the status report representing a history of the movement or lack of movement.

4. The monitoring unit of claim 1, further comprising:

a display in communication with the microcomputer, wherein the display presents one or more graphical user interfaces for operating the monitoring unit.

5. The monitoring unit of claim 1, further comprising:

a pet shield removably coupled directly to the motion sensor so that the pet shield is configured to physically obstructs an outer portion, but not an inner portion, of an aperture of the motion sensor, whereby only an outer portion of a field of view of the motion sensor is obscured to prevent false triggers from pets or other extraneous movements.

6. The monitoring unit of claim 1, further comprising:

an attachment device coupled to the housing, wherein the attachment device enables the housing to be removably coupled directly to a structure in the monitoring area, and wherein the attachment device comprises adhesive, hook and loop fasteners, or magnets.

7. The monitoring unit of claim 1, wherein the electronic alert message comprises one or more hyperlinks to view one or more graphical user interfaces, where the one or more graphical user interfaces display a status report representing a history of the movement or lack of movement.

8. The monitoring unit of claim 1, wherein the electronic alert message is a text message transmitted over one or more networks by the communication device.

9. The monitoring unit of claim 5, wherein the housing is attached to a wall of the monitoring area below a header of a door jamb of a door to the monitoring area, and wherein the pet shield physically obstructs the aperture of the motion sensor, whereby the motion sensor is prevented from sensing pets on a floor of the monitoring area.

10. A method for generating emergency alerts, comprising:

detecting, by a motion sensor, motion within a monitoring area, wherein the motion sensor consists of passive infrared detection so that the motion sensor lacks an ability to capture images or video, whereby privacy of the monitoring area is protected;

determining, by a processor, motion data from the motion sensor, the motion data representing movement and lack of movement by a subject in the monitoring area, irrespective of a posture of the subject;

determining, by the processor, that the lack of movement occurs within a monitoring period;

determining, by the processor, that a duration of the lack of movement exceeds a threshold; and transmit, by a communication device, an electronic alert message to one or more remote electronic devices only if the duration of the lack of movement exceeds said threshold, wherein the electronic alert message indicates a potential emergency based on the lack of movement.

* * * * *